US006906880B1

(12) United States Patent
Codilian

(10) Patent No.: US 6,906,880 B1
(45) Date of Patent: Jun. 14, 2005

(54) ERASING DISK SURFACE BY DIRECT CURRENT APPLIED ON A HELICAL TRAJECTORY TO MINIMIZE ERASE TIME

(75) Inventor: Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 812 days.

(21) Appl. No.: 09/967,837

(22) Filed: Sep. 28, 2001

(51) Int. Cl.[7] ............................................... G11B 5/03
(52) U.S. Cl. ............................................ 360/66; 360/75
(58) Field of Search .......................... 360/66, 57, 75, 360/77.08, 78.14; 361/149

(56) References Cited

U.S. PATENT DOCUMENTS 5,777,813 A * 7/1998 Sun et al. ..................... 360/66

* cited by examiner

Primary Examiner—Alan T. Faber
(74) Attorney, Agent, or Firm—Milad G. Shara, Esq.; Knobbe, Martens, Olson & Bear

(57) ABSTRACT

A method of erasing a disk by applying a direct current to a transducer while the transducer is moved in a selected manner relative to the rotating disk. The rotating disk in conjunction with the erasing transducer moving in a first direction in a substantially continuous and smooth manner yields a helical shaped erased path on the disk. Such helical erasure of the disk is faster than conventional erasure method that erases the disk by erasing in concentric circular paths. To erase in circular paths, the transducer needs to be positioned on that circular path, and positioning of the transducer involves a repositioning time that can be significant. The helical erasure method substantially eliminates the repositioning time since the path of the transducer is substantially continuous and smooth. The reduction in erasure time by use of helical erasure method is substantial when compared to the total erasure time.

18 Claims, 6 Drawing Sheets

ERASING DISK SURFACE BY DIRECT CURRENT APPLIED ON A HELICAL TRAJECTORY TO MINIMIZE ERASE TIME

BACKGROUND OF THE INVENTION

1. Field of the Invention

The present invention relates to computer data storage devices and, in particular, relates to a method of erasing a disk during a manufacturing process.

2. Description of the Related Art

Hard disk drive storage devices are an important component in virtually all computer systems. In particular, hard disk drives provide computer systems with the ability to store and retrieve data in a non-volatile manner such that the data is maintained even if power is removed from the device. The popularity of these devices is based on their ability to quickly store and retrieve large quantities of digital information at low cost.

The typical hard disk drive comprises one or more pivotally mounted disks having a magnetic recording layer disposed thereon and a plurality of magnetic transducer elements for affecting and sensing the magnetization states of the recording layer. The recording layer comprises a large number of relatively small domains disposed thereon that can be independently magnetized according to a localized applied magnetic field and that can be maintained in the magnetized state when the external field is removed. The domains are generally grouped into concentric circular data tracks each having a unique radius on the disk and data is written to or read from each track by positioning a transducer adjacent the disk at the corresponding radius while the disk is rotated at a fixed angular speed.

The disk further comprises a plurality of servo wedges defining servo tracks disposed adjacent the data tracks. The servo wedges function as reference markers to permit a controller to determine the location of the transducer on the disk in an accurate manner. The servo wedges are written to the magnetic media of the disk during a manufacturing process called the servo track write process. This process typically occurs after the disk drive is in a near completed state. In particular, the disk(s) is mounted on a spindle to permit rotation, and the transducer is mounted on an actuator to permit movement relative to the surface of the disk. As is well known in the art, the motion of the actuator (and thus the transducer) is typically performed by a voice coil motor (VCM) that has a permanent magnet interacting with an electromagnet.

As with any manufacturing process, some disk units end up with faulty written information, such as the servo wedges, on the magnetic media Faulty servo wedges can lead to the controller being unable to accurately position and maintain the transducer on the tracks defined by the faulty servo wedges. As a result, data capacity and overall performance of the disk is reduced. To correct this problem, these disks may undergo complete magnetic erasure to yield a 'clean slate' of magnetic media on which new servo wedges can be rewritten. One method of erasing the disk is to subject the entire disk to a magnetic field with a predetermined field strength to demagnetize the existing magnetized domains such as the servo wedges. A drawback to such a complete demagnetization is that other parts of the disk drive also are subjected to the magnetic field and may become adversely affected. As an example, permanent magnet of spindle motor can become partially demagnetized, thus reducing the spindle motor's startup torque generation capability. Other parts in the disk drive, such as the VCM can also become partially demagnetized by the magnetic field.

Another method of erasing the disk comprises a partial erasure of a portion of the disk using the external magnetic field, followed by a track-by-track erasure using the transducer. In this method, the hard disk drive is partially inserted between two magnet pole pieces, between which a magnetic field exists. The strength of the magnetic field is selected to erase the magnetic media of the disks. A structural member of the hard disk drive is attached to a carriage that controls how far the hard disk drive moves into the magnetic field. The hard disk is preferably positioned so that the VCM end of the actuator and the spindle are not subjected to the full strength of the magnetic field.

When a portion of the hard disk is placed in the magnetic field, the rotation of the disks causes the outer portion of the disks to be erased, while leaving the inner portion unerased. The inner portion of the disk is subsequently erased using the transducer, whereby the structural member of the hard disk drive is mounted to a servo track writer carriage so as to provide an accurate positioning of a push rod relative to the actuator and the disk. The disk is rotated while an erase signal is applied to the transducer such that one rotation of the disk with the stationary transducer yields an erased band that is substantially circular.

The erasing process preferably begins near the boundary between the mass-erased outer portion and the unerased inner portion, such that transducer erased bands overlap a portion of the outer portion to ensure substantially complete erasure. Once the first circular erased band is made, the transducer is moved inward by a push rod pushing on the actuator in a predetermined manner so as to erase a smaller radius circular path.

To ensure that substantially all of the inner portion is erased, a given erased band overlaps with the previous erased band and the next erased band. To accommodate such overlaps, the transducer is typically moved inward in half-servo track width increments. The width of the erased band is typically less than the Width of the servo track. Thus, shifting of the transducer in half-servo track width increments yields areas of erasure overlap between the two adjacent erased bands. Therefore, it typically takes two erased bands to erase one servo track.

In addition to the inefficient overlapping of the erased bands, the current method of erasing the disk in overlapping concentric circular tracks suffers from time consumed during repositioning of the transducer to a new circular path. As is well known in the art, positioning of the transducer involves settling of the transducer on a target track, a process that typically takes time in the order of few milliseconds. Since a typical disk comprises number of servo tracks in the order of tens of thousands, few milliseconds per track adds up to a significant amount of time.

To appreciate how track-by-track erasing process is relatively time consuming, consider an exemplary disk with 45,000 tracks. Suppose that half of the disk is already mass erased by an external magnet, leaving 22,500 tracks to be erased by the transducer. Since two rotations (two half-track width increments) erases one track, the transducer needs to be positioned 2×22,500 or 45,000 times. If the settling time is 7 ms, then the total time taken up by settlings alone is 315 seconds, or approximately 5 minutes. It will be appreciated that this time is in addition to the total time taken during erasing with the transducer. It will also be appreciated that erasing track by track (and thus being bound with settling times) is an inefficient method, considering that the end result is a simple erased disk surface.

In a mass production, the extra time per unit to settle the transducer on the tracks, as well as the time required to have overlapping erase paths, translates to a significant cost, especially if the limited number of servo track writing apparatuses forms a bottleneck in the overall production process. Thus, there is a need for a method that reduces the overall time used to erase a disk using a transducer. To this end, there is a need for a method of erasing at least a portion of the disk surface that does not require as much overlap of the erase path and also reduces the amount of time needed to settle the transducer on each of the tracks to be erased.

SUMMARY OF THE INVENTION

The aforementioned needs are satisfied by the method of erasing a portion of a disk surface of a disk drive having magnetically recorded components recorded therein. In one aspect this method comprises rotating a disk about an axis of rotation and moving a transducer across the disk surface such that the transducer travels over a continuous overlapping path of the potion of the disk surface so as to substantially cover the portion of the disk surface. The transducer is moved such that the combined rotational motion of the disk and the movement of the transducer results in the continuous overlapping path having a plurality of circumferential components of continuously varying radial distances from the axis of rotation wherein adjacent circumferential components overlap each other. The method further comprises applying a signal to the transducer while the transducer is travelling over the continuous overlapping path such that the magnetically recorded data located in the portion of the disk surface are erased.

Since the transducer is moving over a continuous overlapping path with a continuous decreasing radius, settling times needed to settle the transducer at a particular radial path are avoided. In this way, magnetic components, such as erroneous servo tracks can be erased faster during the formation process.

In another aspect, the present invention comprises a method of erasing a plurality of circumferential servo tracts at a plurality of radial positions on a disk of a hard disk drive. In this aspect, the method comprises rotating the disk about an axis of rotation a moving a transducer having a first width in a first direction having a radial component such that the transducer defines a continuous overlapping path over a first portion of the disk surface. The continuous overlapping path has a varying radial component such that the path extends over the plurality of circumferential servo tracks in the first potion of the disk surface. The method further comprises applying a signal to the transducer while the transducer is travelling over the continuous overlapping path such that the plurality of circumferential servo tracks are erased without requiring the transducer to be aligned with the plurality of radial positions of the plurality of circumferential servo tracks.

Hence, the methods disclosed herein permit faster erasure as the overlap need not be as great as with previous erasure methods. Moreover, settling times can be avoided by the continuous overlapping path, which in one implementation is a helical path. These and other objects and advantages will become more apparent from the following description taken in conjunction with the accompanying drawings.

DETAILED DESCRIPTION OF THE PREFERRED EMBODIMENT

Figure 1A:
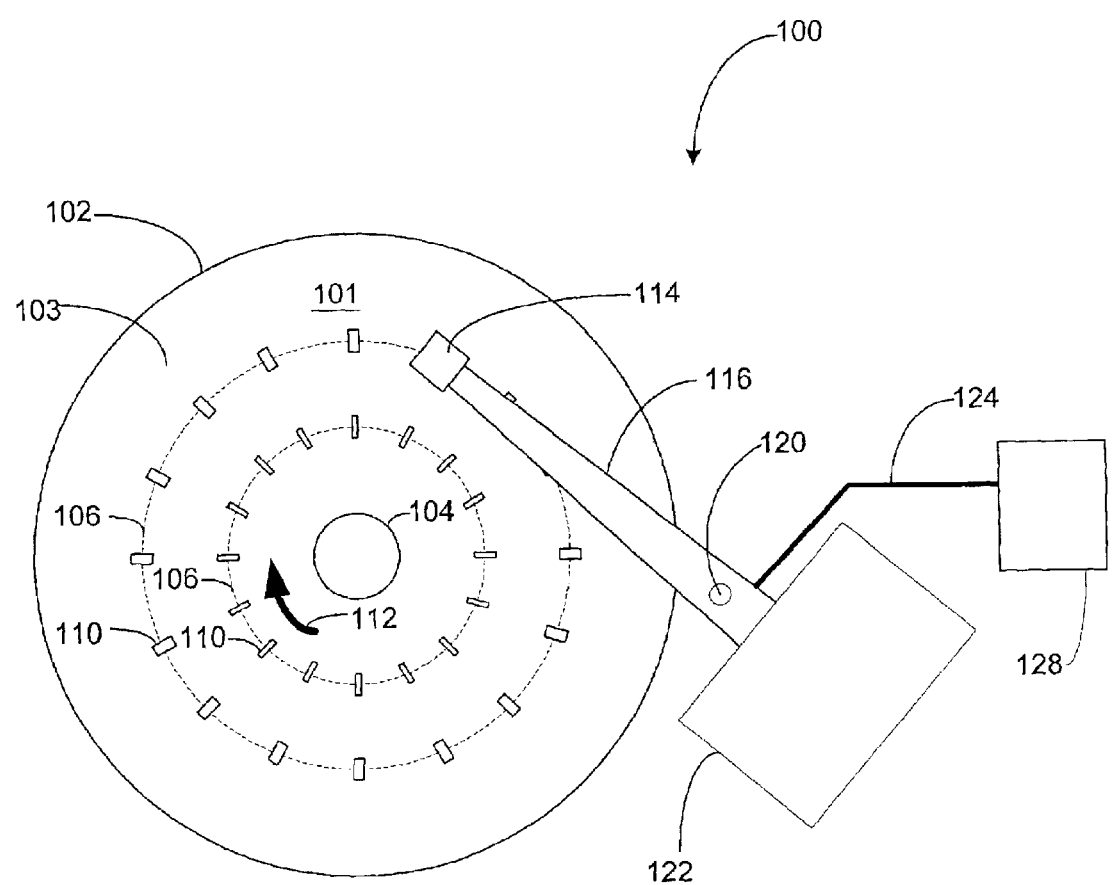
FIG. 1A illustrates a typical hard disk drive that has a rotatable disk shaped magnetic media positioned relative to a transducer mounted on a rotatable actuator.

Reference will now be made to the drawings wherein like numerals refer to like parts throughout. FIG. 1A schematically illustrates a hard disk drive 100 for storing information. The hard disk drive 100 includes a plurality of disks 102 that have a magnetic media 101 formed on the surfaces 103 of the disks 102. The magnetic media 101 is programmable such that application of an external magnetic field results in a change of the magnetic state of the media which permits the magnetic media to be selectively magnetized to store data The disks 102 are preferably organized into a plurality of concentric magnetic domains which include servo tracks 106. A given servo track 106 is defined by a plurality of servo wedges 110 that are arranged so as to be substantially similarly spaced from an axis of a spindle 104 about which the disk 102 rotates. The serve wedges 110 on a given track 106 are spaced circumferentially in a periodic manner and they provide positional information used by the hard disk drive 100 during reading and writing operations in a manner known in the art.

The hard disk drive 100 further comprises a transducer 114 mounted on an actuator 116 that rotates about a pivot 120 due to controlled torques applied by a voice coil motor (VCM) 122. A signal bus 124 interconnects the transducer 114 and the VCM 122 to a controller 128 such that the controller 128 can control the movement of the actuator 116 in a manner well known in the art. Furthermore, the controller 128 sends and receives signals to and from the transducer 114 so as to permit the transducer to read, write, and erase information contained on the disk 102.

In operation, the disk 102 rotates in an exemplary direction 112 about the axis of the spindle 104 at a substantially fixed angular speed such that the surface 103 of the disk 102 moves relative to the transducer 114. The transducer's radial position on the disk 102 is changeable by the rotation of the actuator 116 so as to be able to position the transducer 114 on a desired servo track 106. The transducer's radial and circumferential position on the disk 102 is determined by reading of the information contained in the servo wedges 110 in a manner well known in the art. Once the transducer 114 is positioned on the desired servo track 106, data can be written or read to or from a circular arc between the servo wedges 110.

Figure 1B:
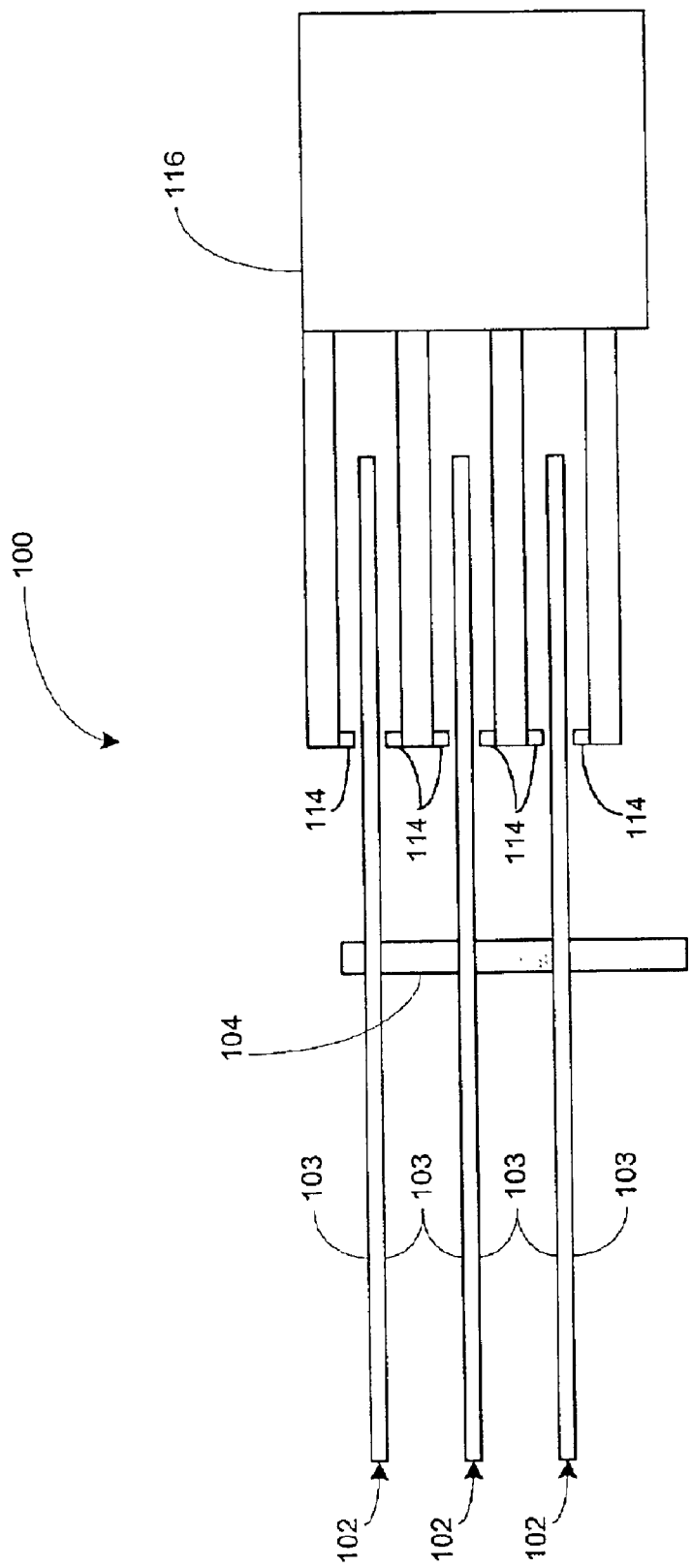
FIG. 1B illustrates a side view of the hard disk drive showing how several disks can be stacked to increase the capacity of the hard disk drive.

FIG. 1B illustrates a side view of the hard disk drive 100, showing that the hard disk drive 100 may have more than one disk 102 mounted on a common spindle 104. Associated with each disk surface 103 is a transducer 114 mounted to a common actuator 116. Thus, the disks 102 rotate in unison, and the transducers 114 move in unison relative to the rotating disks 102. The transducers 114 are arranged to have substantially same radial distance from the axis of the spindle 104, such that the transducers 114 trace out circles on each disk 102 to form an outline of a cylinder. As such, the servo tracks are frequently referred to as cylinders.

The servo wedges 110 referred to above are written to the disks 102 at a factory during manufacturing in a process called the servo track write process. As in any manufacturing process, some of the disks 102 fail to meet the quality control standards. Such disks 102 are typically erased substantially completely to re-start the manufacturing process. Conventional method typically used at the present, as described in the "Description of the Related Art" section, take relatively long time to complete the erasing process.

In one implementation, the erasing process of the illustrated embodiment relates to erasing the disks 102 by applying a direct current (DC) erase signal to the transducer 114 as the transducer 114 is moved relative to the disk surf-ace 103 in a manner that does not rely on repeated step and settling of the transducer 114 to circular trajectories. The disks 102 to be erased in this manner may already have been at least partially erased by an external magnetic field in a manner known in the art.

Figure 2A:
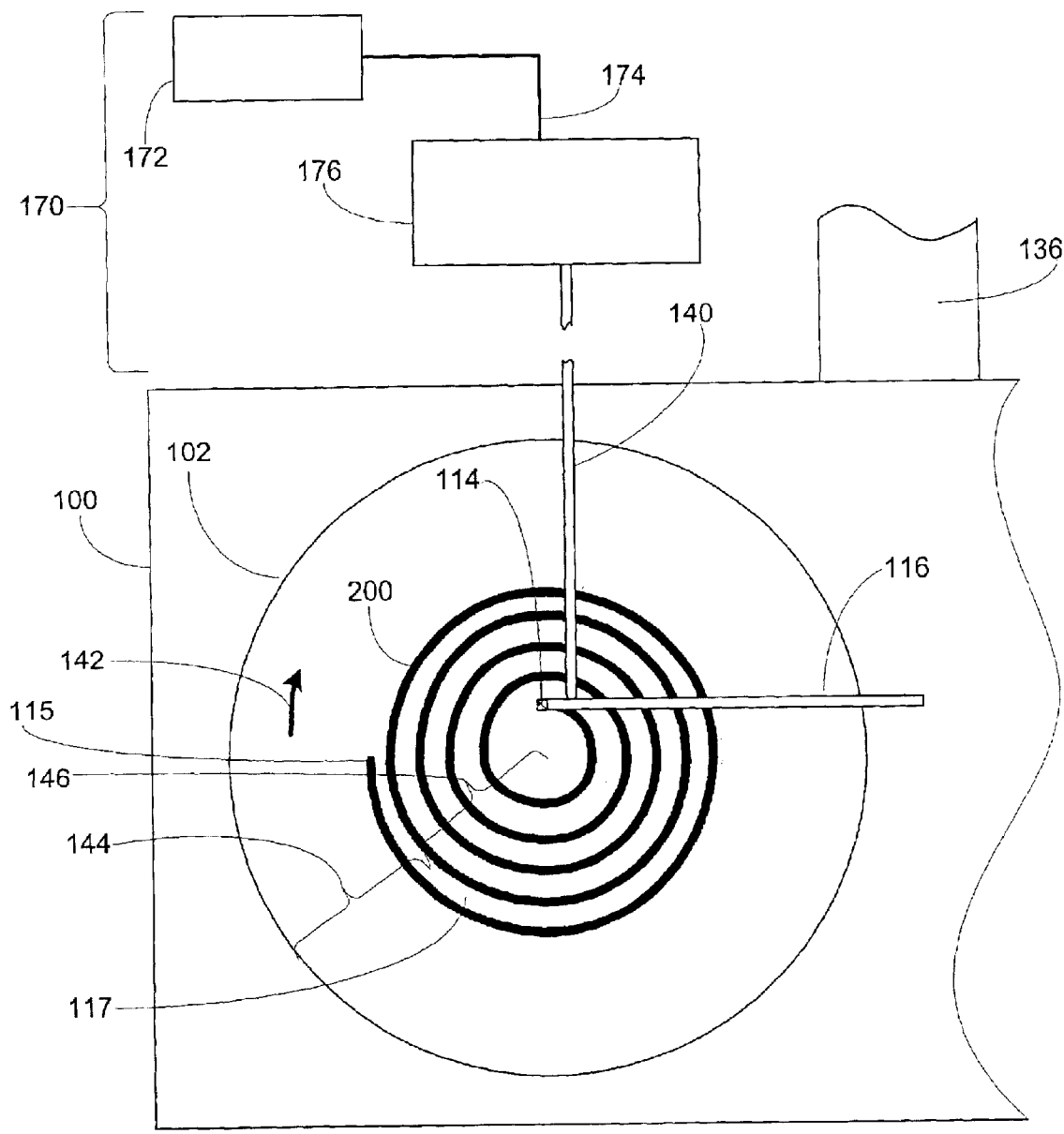
FIG. 2A illustrates one method of erasing the unerased portion of the disk that underwent partial mass erasure, wherein the erasure path forms a helical shape, not relying on repositioning of the transducer on circular paths.

FIG. 2A illustrates one embodiment of the invention, wherein the hard disk drive 100 is attached to a servo track writer apparatus 170. In particular, the hard disk drive 100 is mounted on a servo track writer fixture 136. The servo track writer 170 comprises a controller 172 that is interconnected to a push rod actuator 176 by a connection 174 so as to control the movement of a push rod 140 that engages the actuator 116.

The partially erased disk 102 comprises an outer portion 144 that has been mass erased by an external magnetic field in a manner described above, and an inner portion 146 that needs to be erased using the DC erase signal applied to the transducer 114. The transducer 114 is initially positioned at a location 115 on the erased outer portion 144, near the boundary 117 that separates the outer portion 144 and the inner portion 146. As the disk 102 spins in an exemplary direction 142 at a substantially constant rate, the push rod 140 pushes on the actuator 116 at a selected rate so as to cause a substantially continuous helical path traced out by the transducer 114 The erase signal applied to the transducer 114 thus causes a helical erased path 200 as exemplified in FIG. 2A. It will be understood that the helical erased path 200 depicted in FIG. 2A shows an exaggerated inward progression of the transducer 114. To substantially erase all of the disk's surface, a given segment of the helical erased path is made to overlap with radially adjacent segments.

Figure 2B:
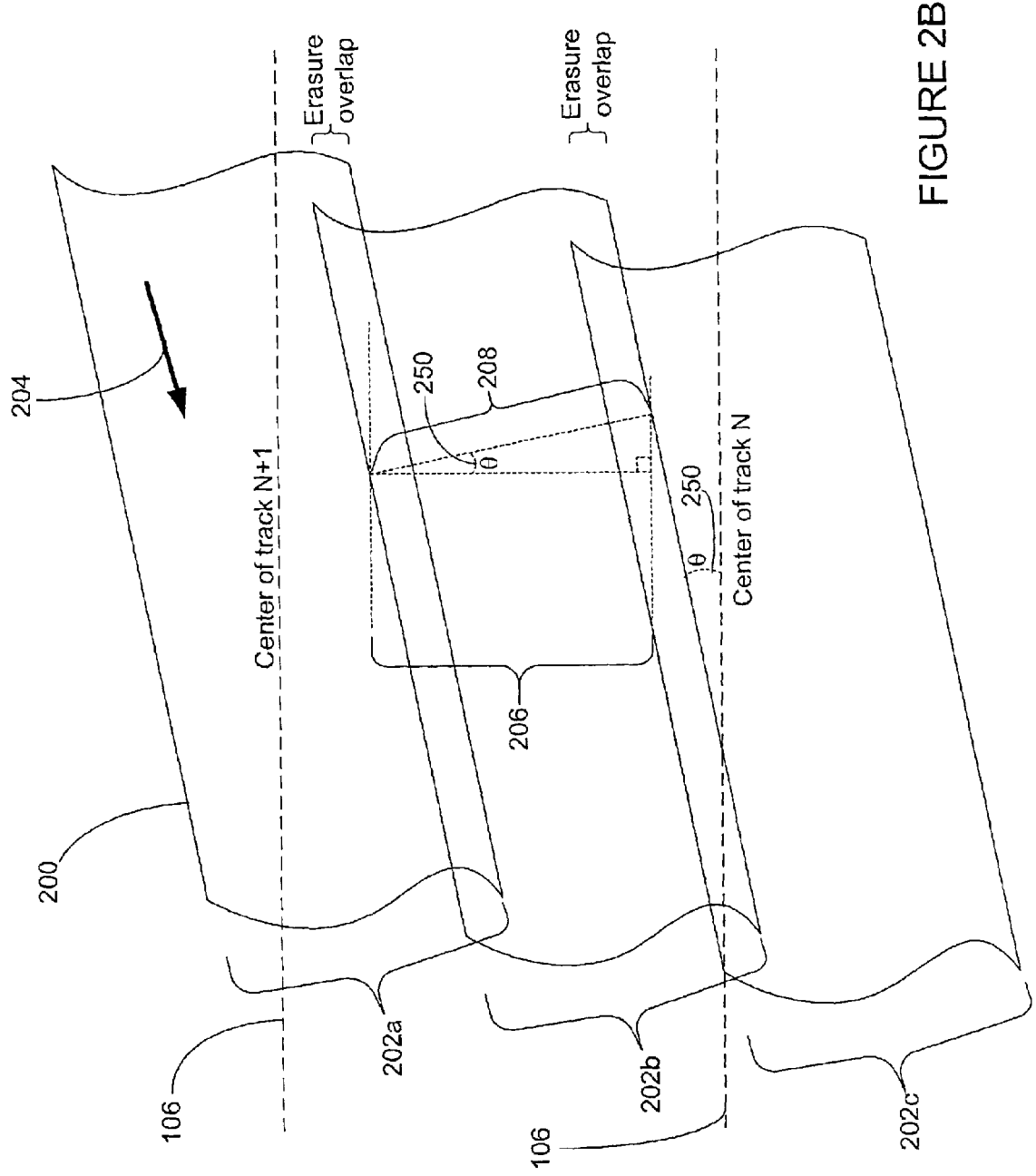
FIG. 2B illustrates the erasure method of FIG. 2A at the servo track level.

FIG. 2B illustrates how a given section of the helical erased path 200 overlaps with radially adjacent segments. An N-th and (N+1)th servo tracks are represented as dashed lines, and the distance between the two servo tracks can be taken to be equivalent to the width of the servo track 106. For the description purpose, the N-th track is assumed to be located towards the inside of the disk 102. The helical erased path 200 begins near the border between the outer portion 144 and the inner portion 146, as described above in reference to FIG. 2A, and progresses inwards, so as to form the exemplary erased overlapping sections in FIG. 2B.

The exemplary erased portion of the disk comprises first, second, and third erased sections 202a, 202b, and 202c. The direction of the erasure path is indicated by an arrow 204, such that the first section 202a is erased before the second and third sections 202b, 202c. It will be understood that the helical erased path 200 forms a substantially continuous path, such that the first, second, and third erased sections 202a, 202b, 202c are parts of the same helical erased path 200.

FIG. 2B further illustrates an effective width 206 of the helical erased path 200 that is less than the head width 208 that the transducer is capable of erasing. This reduction in the effective width 206 is due to the fact that the transducer is oriented for optimal track coverage when it moves in a circular path relative to the disk, as is the case during normal operation of the hard disk drive. Since the transducer is now made to move at a trajectory that forms a small angle $\theta$ 250 with respect to the concentric circles, the effective width 206 of the helical erased path 200 is approximately equal to $\cos\theta$ times head width 208. As described below, it will be appreciated that the effect of the reduction in the erased path width is relatively small when compared to the advantages afforded by the helical erasure. In one embodiment, the effective width 206 covers approximately 65% of the servo track width (track pitch).

It will be appreciated that the exemplary servo tracks 106 illustrated in FIG. 2B are typically defined by the servo wedges 110 (FIG. 1A). The integrity of the servo wedges 110 that define the servo tracks 106 may be compromised in many of the disks 102 prior to the erasure process described above. As an example, some of the servo wedges 110 on the inner portion 146 (FIG. 2A) may be affected by the fringe field from the external magnetic field that mass-erases the outer portion 144. Also, some of the servo wedges 110 may be faulty to begin with.

It will be appreciated that the method of erasing the disk described herein, wherein the erased path is a substantially continuous helical path, does not need to depend on the servo wedges 110 in order to accomplish the erasure. As described below in greater detail, the erasure method permits erasure of the disks in various manners without having to rely on the servo wedges 110 for positioning of the transducer 114.

Figure 3:
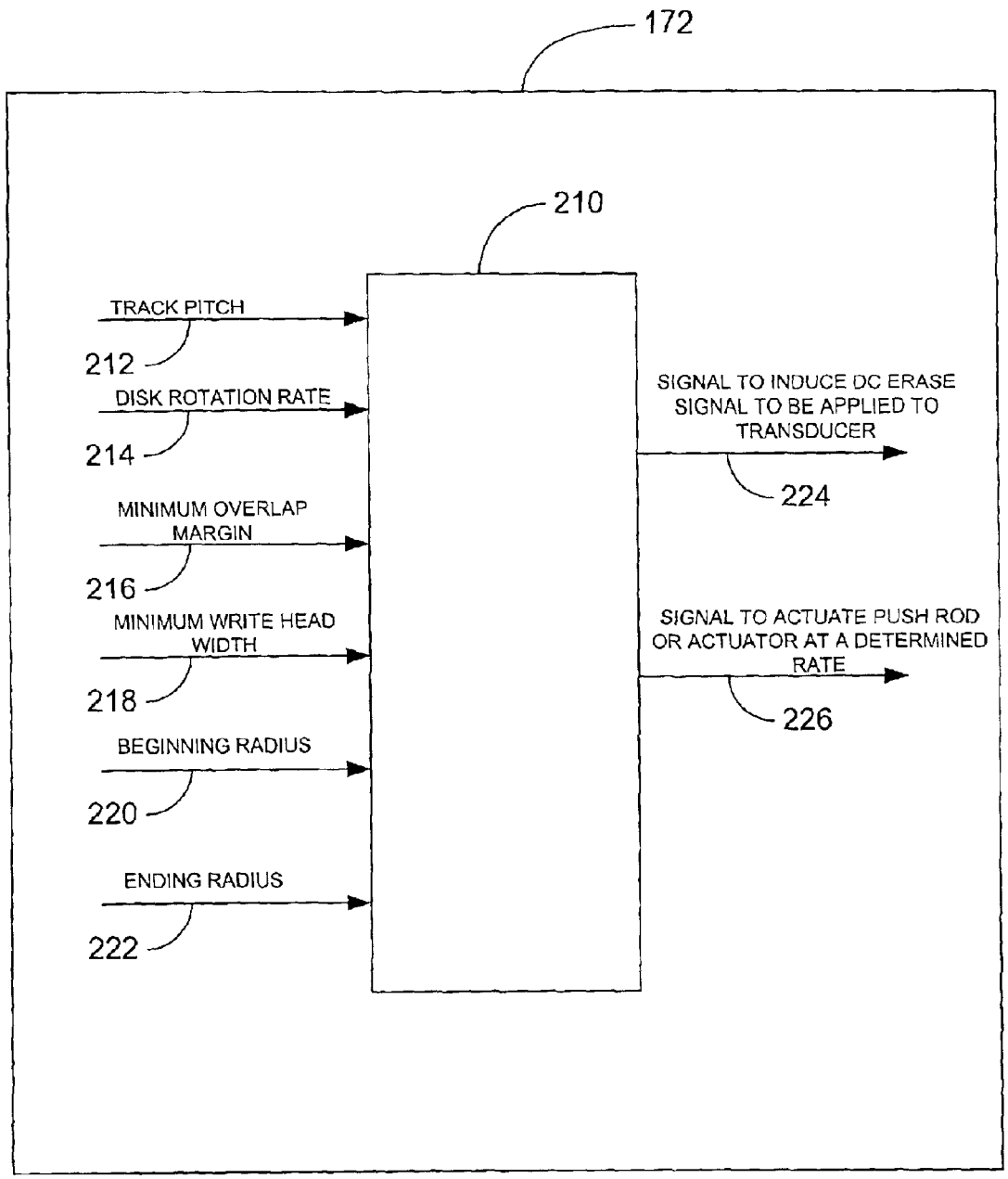
FIG. 3 illustrates a block diagram of a processor that determines a rate at which a transducer moves to cause a helical erased path.

FIG. 3 illustrates a block diagram of an exemplary method that can be used to obtain the helical erased path 200 described above. The servo track writer apparatus 170 (FIG. 2A) comprises the controller 172 having a processor 210 that determines the rate at which the push rod 140 (FIG. 2A) pushes at the actuator 116 to move the transducer 114, based on input parameters. The input parameters may include track pitch 212, disk rotation rate 214, minimum desired overlap margin 216, minimum write head width 218, beginning radius 220, and ending radius 222. The output of the processor 210 may include a signal 224 to induce DC erase signal that is to be applied to the transducer 114, and a signal 226 to actuate the push rod 140 at a determined rate.

It will be appreciated that knowledge of the track pitch (or equivalently, track density) is not needed to implement the helical erasure method described herein. It is common practice in the art, however, to express other parameters, such as the write head width, in terms of the track pitch.

Thus, it will be understood that the use of the term 'track pitch' herein is for convenience of description, and is not meant to imply that the inventive methods depend on knowledge of the track pitch parameter.

In one embodiment, the parameters 212, 214, 216, 218, 220, 222 may be input by an operator. In another embodiment, the same parameters may be stored in a memory location so as to be retrieved and applied for erasure of similar hard disk drives. Such profiling of the erasure parameters for a given type of hard disk drive is typically performed once offline during a setup stage.

The push rod's rate of pushing (output signal 226) may be determined in an exemplary manner described below. Suppose that the disk to be erased has a track density of 45,000 tracks per inch, and has a disk rotation rate 214 of 5,400 rpm. Such a disk has a track pitch 212 of approximately 0.56 $\mu$m, and takes approximately 11.1 ms for one full revolution. Also suppose that an overlap margin 216 of 5% is desired. Assuming that the effective width 206 of the minimum write head width 218 is 65% of the track pitch, as referred to above, each revolution of the disk effectively erases 60% (65%–5%) of the track. Thus, it takes approximately 1.67 revolution (1/0.60) to erase one full track. The rate at which the transducer needs to move radially inward to erase in the manner described above is given by:

$$(0.56\ \mu m/track) \times (0.60\ track/rev) \times (1\ rev/11.1\ ms) = 0.030\ \mu m/ms = 30\ \mu m/s.$$

Thus, the processor 210 needs to output the signal 226 to actuate the push rod to move the transducer inward at the rate of approximately 30 $\mu$m/s.

The processor 210 also determines the starting and ending radii of the area of the disk to be erased from the inputs 220 and 222. In one embodiment, the transducer is pushed to the beginning radius by the push rod, and the erasure begins in the manner described above. When the transducer reaches the ending radius on the disk, the push rod stops pushing on the transducer, and the erasure stops.

The exemplary method of moving the transducer over the disk so as to erase in a substantially continuous helical manner described above can be implemented in any number of configurations. FIGS. 4A to 4D illustrate some of the possible implementations.

Figure 4A:
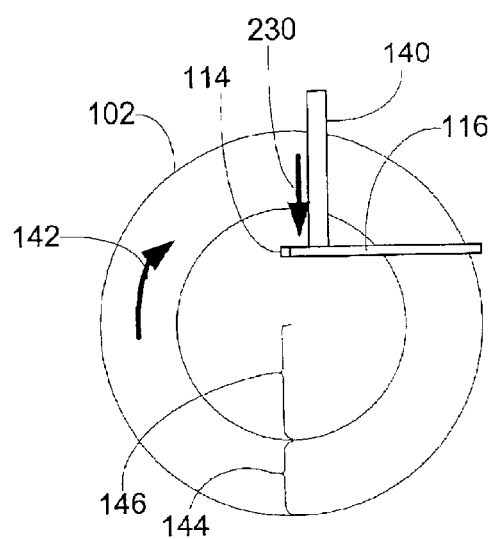
FIG. 4A illustrates erasure of a partially erased rotating disk, wherein the actuator is moved by a push rod so as to cause a helical erased path by the transducer.

FIG. 4A illustrates the disk 102 being erased in a manner similar to that described above in reference to FIG. 2A. The disk comprises the outer portion 144 that has been already erased, such as by use of an external magnetic field. The disk 102 is rotated about the axis of the spindle (not shown) in the exemplary direction 142 while the transducer 114 is supplied with the erase signal. The transducer 114 is moved in a predetermined manner similar to that described above in reference to FIGS. 2A to 3 by the push rod 140 pushing on the actuator 116 in a first direction 230. The resulting overlapping helical path thus erases the inner portion 146.

Figure 4B:
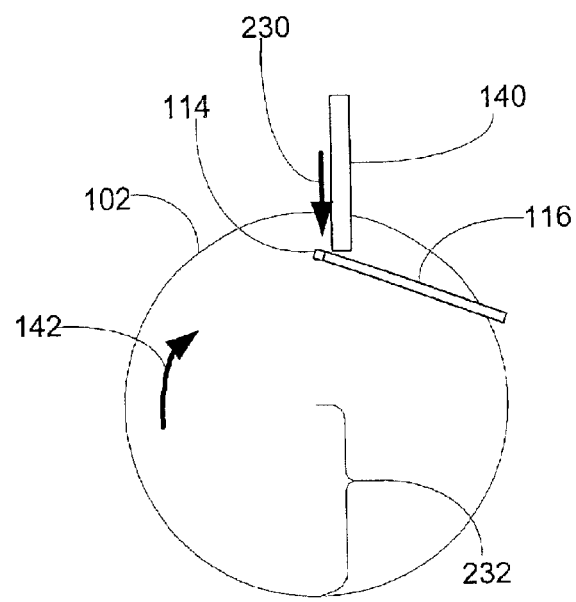
FIG. 4B illustrates erasure of an unerased rotating disk, wherein the actuator is moved by the push rod so as to cause a helical erased path by the transducer.

FIG. 4B illustrates another possible implementation of the helical erasure method, wherein the disk 102 comprises substantially unerased region 232. The disk 102 is rotated in the exemplary direction 142 at a predetermined rate, and the transducer 114 is moved from the outer edge of the disk towards the center of the disk by the push rod 140 pushing on the actuator 116 in the first direction 230. The transducer 114 is supplied with the erase signal such that the resulting overlapping helical path erases substantially all of the disk 102.

Figure 4C:
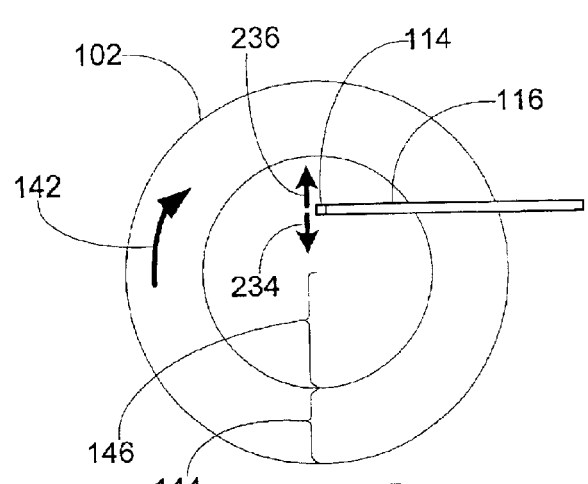
FIG. 4C illustrates erasure of a partially erased rotating disk, wherein the actuator moves due to a supplied signal from a controller so as to cause a helical erased path by the transducer.

FIG. 4C illustrates yet another possible implementation of the helical erasure method, wherein the disk 102 comprises the outer portion 144 that has been already erased, such as by use of an external magnetic field. The disk 102 is rotated about the axis of the spindle (not shown) in the exemplary direction 142 while the transducer 114 is supplied with the erase signal. In this implementation, the transducer 114 is moved by a predetermined signal (226 in FIG. 3) being applied to the actuator 116 so as to cause the transducer 114 move in a first direction 234 or a second direction 236. In one embodiment, the transducer 114 begins the helical erasure from inside of the disk 102, moving outward. In another embodiment, the transducer 114 begins the helical erasure from the outer portion of the disk 102, moving inward. The resulting overlapping helical path thus erases the inner portion 146. It will be appreciated that this method of erasure can also be applied to a disk that is substantially unerased, such as that described above in reference to FIG. 4B.

Figure 4D:
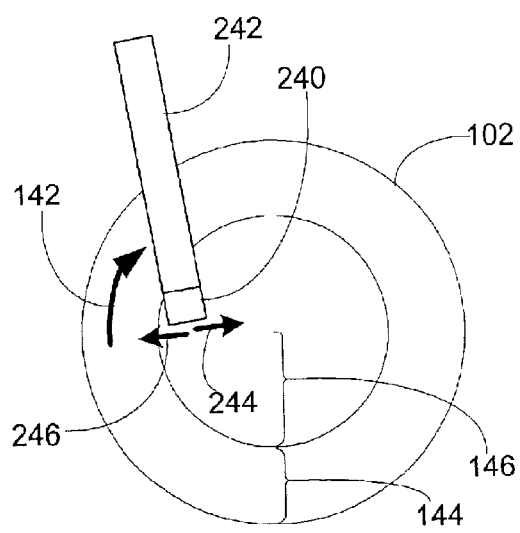
FIG. 4D illustrates erasure of a partially erased rotating disk, wherein an external transducer is moved relative to the disk so as to cause a helical erased path.

FIG. 4D illustrates yet another possible implementation of the helical erasure method, wherein the disk 102 comprises the outer portion 144 that has been already erased, such as by use of an external magnetic field. The disk 102 is rotated about the axis of the spindle (not shown) in the exemplary direction 142 while an external transducer 240 mounted on an arm 242 is positioned over the disk 102 and supplied with the erase signal. As discussed above, most servo writers utilize the transducers of the actuator arms of the disk drive itself for writing and erasing servo wedges. It will be appreciated however, that servo writers can also be equipped with an external erasure transducer 240 having a greater width to facilitate quicker erase time utilizing the helical path erase technique of the illustrated embodiment without departing from the spirit of the present invention.

The arm 242 is adapted to be controllably moved so as to cause the external transducer 240 to move at a selected rate in directions 244 or 246. The resulting overlapping helical path thus erases the inner portion 146. In one embodiment, the external transducer 240 is sized to cause a wider erased path than that of the disk drive's transducer 114, thus reducing the time needed to complete the erasing process. It will be appreciated that this method of erasure can also be applied to a disk that is substantially unerased, such as that described above in reference to FIG. 4B.

It will be appreciated that various implementations of the helical erasure method described above in reference to FIGS. 4A to 4D are some of the many possible implementations. It will be appreciated that erasing of the disk by causing an erased path that is substantially smooth and continuous, such as that of the helical path, can be implemented in any number of ways so as to provide advantages in the erasing process. One such advantage is described below.

It will be appreciated that the erasure of the disk by a substantially continuous and smooth trajectory of the transducer does not depend on repositioning of the transducer at various circular tracks on the disk, and thus substantially eliminates transducer repositioning times from the time taken to erase the disk. As an example, a typical repositioning time is approximately 70% of the period of rotation, which is taken to be approximately 11.1 ms above. Thus, it takes approximately 7.8 ms for the transducer to be repositioned on a given circular path.

To erase the disk in a circular manner, the transducer is typically positioned in half-track increments, as referred to in the "description of the Related Art" section. Thus, despite the transducer being oriented optimally for circular erasure, it takes 2 revolutions to erase a track. As such, erasure of half of a 45,000-track disk takes (½)×(45,000)×(2)=45,000 revolutions. With a repositioning time of 7.8 ms associated with each revolution, the total repositioning time taken during 45,000 revolutions is approximately $3.5 \times 10^5$ ms=5.9 minutes. Thus, the helical erasure method described above substantially eliminates at least 5.9 minutes from erasing one exemplary hard disk drive.

It will be appreciated by one of ordinary skill in the art that in mass production, 5.9 minutes can add up to and translate to a significant cost to the manufacturer. This is particularly true if such time delays occur at bottleneck stages, as is often the case with the servo track writer apparatus. One possible remedy is to increase the number of servo track writers. Due to the high cost associated with servo track writers, however, additional capital investment for acquisition of these devices is not a practical option. Thus, it will be appreciated that erasing of the disk in a helical path manner provides significant advantages as described above.

What is claimed is:

1. A method of erasing a portion of a disk surface of a disk drive having magnetically recorded components recorded thereon, the method comprising:

rotating a disk about an axis of rotation;

moving a transducer across the disk surface such that the transducer travels over a continuous overlapping path of the portion of the disk surface so as to substantially cover the portion of the disk surface wherein the transducer is moved such that the combined rotational motion of the disk and the movement of the transducer results in the continuous overlapping path having a plurality of circumferential components of continuously varying radial distances from the axis of rotation wherein adjacent circumferential components overlap each other; and applying a signal to the transducer while the transducer is travelling over the continuous overlapping path such that the magnetically recorded data located in the portion of the disk surface are erased.

2. The method of claim 1, wherein moving the transducer comprises moving the transducer so as to define a continuous overlapping path over a first portion of the disk surface so that the path extends over a plurality of circumferential servo tracks at a plurality of radial positions in a first portion of the disk surface.

3. The method of claim 2, wherein applying a signal to the transducer comprises applying a signal to the transducer while the transducer is travelling over the continuous overlapping path such that the plurality of circumferential servo tracks are erased without requiring the transducer to be aligned with the plurality of radial positions of the plurality of circumferential servo tracks.

4. The method of claim 3, wherein moving the transducer comprises utilizing a push rod to move the transducer in a direction that has a component directed radially with respect to the axis of rotation of the disk.

5. The method of claim 1, wherein moving the transducer comprises moving an actuator arm of the disk drive having a read/write head positioned thereon.

6. The method of claim 5, wherein applying the signal to the transducer comprises applying an erase signal to the read/write head of the actuator arm of the disk drive.

7. The method of claim 1, wherein the continuous overlapping path is a helical path having a plurality of loops of a first width each with a continuously varying radius wherein the radial movement of the actuator is selected such that the outer and inner edges of the plurality of loops of the helical path overlap.

8. The method of claim 7, wherein the inner and outer edges of the plurality of loops of the helical path overlap a thickness equal to approximately 5 percent of the thickness of the loops of the helical path.

9. A method of erasing a plurality of circumferential servo tracks at a plurality of radial positions on a disk of a hard disk drive, the method comprising:

rotating the disk about an axis of rotation;

moving a transducer having a first width in a first direction having a radial component such that the transducer defines a continuous overlapping path over a first portion of the disk surface wherein the continuous overlapping path has a continuously varying radial component such that the path extends over the plurality of circumferential servo tracks in the first portion of the disk surface;

applying a signal to the transducer while the transducer is travelling over the continuous overlapping path such that the plurality of circumferential servo tracks in the first portion of the disk surface are erased without requiring the transducer to be aligned with the plurality of radial positions of the plurality of circumferential servo tracks.

10. The method of claim 9, wherein the transducer is moved in a first direction at a constant rate.

11. The method of claim 10, wherein the first direction has a component that is directed radially inward.

12. The method of claim 9, wherein the continuous overlapping path is a helical path having a plurality of loops each with first width and a continuously varying radius wherein the radial movement of the actuator is selected such that the outer and inner edges of the plurality of loops of the helical path overlap.

13. The method of claim 12, wherein the inner and outer edges of the plurality of loops of the helical path overlap a thickness equal to approximately 5 percent of the thickness of the loops of the helical path.

14. The method of claim 13, wherein the continuously overlapping path has a width that is selected to be approximately 65% of the width of the plurality of servo track.

15. The method of claim 9, further comprising erasing a second portion of the disk surface by positioning the second portion in a substantially constant magnetic field.

16. The method of claim 15, wherein the second portion is located radially outward from the axis of rotation and the first portion is located radially inward such that the substantially constant magnetic field is separated form the axis of rotation during erasure of the plurality of circumferential servo tracks.

17. The method of claim 9, wherein moving the transducer comprises moving an actuator arm of the disk drive having a read/write head positioned thereon.

18. The method of claim 17, wherein applying the signal to the transducer comprises applying an erase signal to the read/write head of the actuator of the disk drive.

* * * * *